United States Patent Office 3,474,848
Patented Oct. 28, 1969

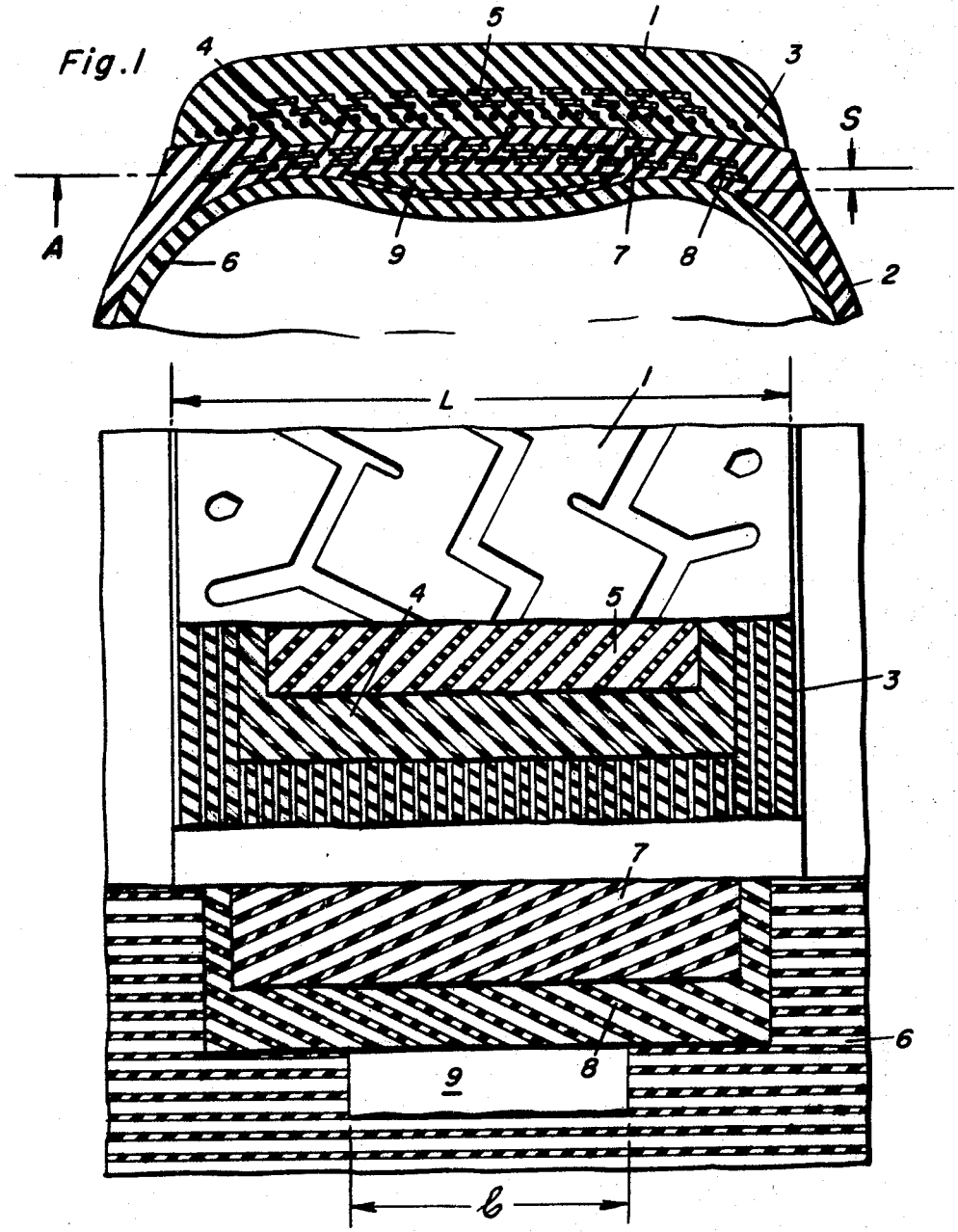

3,474,848
REMOVABLE TREAD TIRES
Luigi Maiocchi, Milan, Italy, assignor to Pirelli, Societa per Azioni, Milan, Italy
Filed May 17, 1967, Ser. No. 639,127
Claims priority, application Italy, July 15, 1966, 16,487/66
Int. Cl. B60c *11/00*
U.S. Cl. 152—176    10 Claims

ABSTRACT OF THE DISCLOSURE

A removable tread tire having a tread ring provided with an annular reinforcing structure inextensible in the longitudinal direction and a carrying casing provided with a carcass to which the tread ring is fastened by means of the inflation pressure of the tire. A circular rubber sheet is disposed in the tire in a radially innermost position with respect to the reinforcement of the tread ring and in a radially outermost position with respect to the carcass.

BACKGROUND OF THE INVENTION

Field of the invention

The present invention relates to pneumatic tires of the so-called "removable tread" type, and more particularly to pneumatic tires consisting of a tread ring and a carrying casing on which said tread ring is assembled.

Prior art

It is generally known to provide a pneumatic tire having a tread ring fastened to a carrying casing by virtue of the friction forces which are originated between the two parts when the tire is inflated. To achieve this, the tread ring is provided with an internal reinforcement which makes it inextensible in the longitudinal direction, and has an inner diameter smaller than the outer diameter the carrying casing would take if it were inflated without applying the tread ring. Therefore, upon inflation of the tire, an interference is generated between the carrying casing, which tends to reach its equilibrium profile, and the tread ring, which opposes this tendency. The result of this is the creation of a thrust which pushes the carrying casing against the tread ring.

The fastening of the tread ring on the carrying casing depends therefore on this interference, and its efficiency is better when the index $H/C$ is lower, H being the section height and C the section width, both measured on the median ply of the carcass. The results are best when the value of this index does not exceed 0.92.

This value can be easily obtained in designing new tires, in which the dimensional ratios of the tire section can be established with a certain freedom, but is much more difficult in designing removable tread tires intended to replace conventional tires of vehicles already in use. In this latter case the outer dimensions are often critical, since many factors are to be taken into account, as for instance the ratio of the bevel gear at the rear axle, which makes it necessary to give to the new tire a certain rolling radius, and the existence of a limited space to accommodate the tire which hinders the increase of the tire dimensions, and especially the section width. In conventional tires, since the section height is nearly equal to, and often greater than, the corresponding section width, it is sometimes impossible to obtain an $H/C$ value smaller than 0.92, and therefore to ensure the fastening of the tread ring in all service conditions, including cases of emergency, such as "blow-outs" and the like.

SUMMARY OF THE INVENTION

An object of the present invention is to provide a removable tread tire having outer dimensions similar to those of the above-mentioned conventional tires, but possessing features equal to those heretofore obtainable only by designing completely new tires.

Briefly summarized, the present invention relates to a removable tread tire in which the tread ring is fastened to the carcass by means of the inflation pressure, the tread ring being provided with an annular reinforcing structure inextensible in the longitudinal direction, and the carrying casing being provided with a carcass. A circular rubber sheet extends along the whole tire circumference and is of lens-like shape in cross section (has two opposite regulator surfaces one of which is curved and the other of which is planar), The maximum thickness of this sheet ranges between 0.2 and 1.5% of the diameter the carcass would take in the absence of said sheet, and the sheet is disposed in a radially innermost position with respect to the reinforcement of the tread ring, and in a radially outermost position with respect to the carcass.

In a preferred embodiment of the invention, the thickness of the central part of the lens-like sheet is such that it causes the top portion of the carcass to take a generally concave shape direced towards the outside, when the tire is inflated. Also, this effect can be obtained by incorporating the lens-like sheet in the tread ring.

The removable tread tire of the present invention may also be provided in its carrying casing with a breaker structure constituted by one or more layers of cords parallel to one another in each layer and disposed in a radially outermost position with respect to the carcass. In this case the lens-like sheet is preferably inserted between the carcass and the breaker structure. This alternative embodiment permits the necessary deformation of carcass, without affecting the original shape of the breaker structure. Also, the lens-like sheet may be inserted radially outwardly of the breaker structure.

According to a further preferred embodiment of the invention, the lens-like sheet is made of a rubber compound having a hardness greater than that of the compound used for rubberizing the carcass, said hardness ranging preferably between 60° and 70° Shore. The use of this compound, having a rather considerable hardness, does not prevent the transmission to the tread ring of the thrusts due to the inflation pressure.

BRIEF DESCRIPTION OF THE DRAWINGS

The invention will now be better described with reference to the attached drawing, given by way of nonlimiting example, in which:

FIG. 1 is a partial section of a tire in accordance with the invention; and

FIG. 2 represents the tire portion shown in FIG. 1 developed in plane and with parts broken away to show the position of the various elements.

DESCRIPTION OF THE PREFERRED EMBODIMENTS

FIGS. 1 and 2 illustrate a tire in accordance with the present invention which comprises a tread ring 1 and a carrying casing 2.

The tread ring 1 is provided with an annular reinforcing structure, inextensible in the longitudinal direction and formed by a layer 3 of metal cords wound up in the longitudinal direction. Two layers 4 and 5 of metal cords may also be provided, which are parallel to one another in each layer, and which cross at an angle of about 45° with respect to the longitudinal axis of the tread ring.

The carrying casing 2 is provided with a carcass 6 of the so-called "radial" type, formed by cords of textile material, or the like, lying in radial planes.

A breaker structure may be formed in casing 2 and consists of layers 7 and 8 of metal cords parallel to one another in each layer and crossing at an angle of about 68° with respect to the longitudinal axis of the tread ring.

A sheet 9 of rubber compound having a Shore hardness of 65° and a lens-like cross section is inserted between the carcass 6 and the breaker structure 7 and 8, thus causing the top portion of the carcass to take a generally concave shape with respect to the tread ring, when the tire is inflated.

The size of the lens-like sheet and the consequent deformation of the carcass are to be selected in view of various factors, such as the size of the tire section, and the service for which the tire is intended. For example, in tires for trucks and buses, for which the present invention has proved to be particularly useful, the thickness of the central portion of the lens-like sheet 9 may advantageously range between 0.3 and 1% of the greatest diameter the carcass would take without the lens-like sheet. The width of said sheet may generally range between one-fourth and two-thirds of the width of the tread ring.

It should be noted that sheet 9 must be of rubber, rather than of an inextensible structure, since the use of the latter would prevent the transmission of thrust due to the inflation pressure to the tread ring, and would therefore affect the fastening of the tread ring on the carrying casing.

In the example shown in FIG. 2, a tire of 12.00–20 size is represented and the thickness S of the lens-like sheet is 6 mm., which is 0.58% of the diameter D the carcass would take without the sheet, which is 1030 mm. The width $l$ of the lens-like sheet 9 is 100 mm., which is slightly less than one-half the width L of the tread ring, which is 210 mm.

From practical tests carried out on pneumatic tires manufactured in accordance with the above-indicated principle, a considerable improvement of the coupling conditions between the carrying casing and the tread ring were achieved. By adopting ratios between the outer section height and the outer section width similar to those of the conventional tires, namely near to or higher than 1, even the smallest mutual displacement between the tread ring and the carrying casing was not ascertained, in any severe running condition.

Moreover, as further unexpected advantages, the steerage and the running stability of the vehicle were considerably improved. The improved steerage is presumably due to the fact that the rubber sheet confers to the unit constituted by the carcass and the breakers structure a better resistance against torsion stresses and, accordingly, a better behavior against the creation of transversal forces when cornering.

Thus, in utilizing the arrangement of the present invention is conventional tires having a $H/C$ ratio approximately equal to or greater than one, the features obtained are similar to those obtained when the section height is such a value that the ratio $H/C$ is lower than 0.92. This effect could be explained by the fact that the path taken by the plies increases the specific pressure of the carcass against the tread ring in the central position, and therefore improves the stability of the tread ring within its seat.

On the other hand, the increase of thickness at the top portion of the tire will not give rise to an excessive heat generation, since the most dangerous zone is the tread corner, whch is not involved in this arrangement.

It is understood that the present invention is not limited to the above reported example, but that it includes any other alternative embodiment based on the above described inventive principle.

I claim:
1. A removable tread tire having a tread ring provided with an annular reinforcing structure inextensible in the longitudinal direction, and a carrying casing provided with a carcass to which the tread ring is fastened by means of the tire inflation pressure; wherein the improvement comprises a circular rubber sheet disposed in said tire in a radially innermost position with respect to said reinforcing structure, and in a radially outermost position with respect to said carcass, said sheet having a lens-like cross section formed by two opposite regular surfaces one of which is curved and the other of which is planar, and a maximum thickness of said sheet being approximately between 0.2 to 1.5% of the diameter the carcass would take in the absence of said sheet.

2. A tire as in claim 1, wherein the thickness of said sheet ranges between 0.3 and 1% of the diameter the carcass would take in the absence of said sheet.

3. A tire as in claim 1, wherein said sheet has a width ranging between one-fourth and two-thirds of the width of said tread ring.

4. A tire as in claim 1, wherein said sheet is incorporated in said carrying casing.

5. A tire as in claim 4, further comprising a breaker structure formed by at least one layer of cords parallel to one another in each layer, said breaker structure being disposed in said carrying casing in a radially outermost position with respect to said carcass, said sheet extending between said carcass and said breaker structure.

6. A tire as in claim 4 further comprising a breaker structure formed by at least one layer of cords parallel to one another in each layer, said breaker structure being disposed in said carrying casing in a radially outermost position with respect to said carcass, said sheet extending in a radially outermost position with respect to said breaker structure.

7. A tire as in claim 4, wherein the thickness of said sheet is such that the top portion of the carcass has a concavity directed towards said tread ring when the tire is inflated.

8. A tire as in claim 1 wherein said sheet is made of a rubber compound having a hardness greater than that of the compound used for rubberizing the carcass.

9. A tire as in claim 8, wherein the hardness of the compound forming said sheet ranges from 60° to 70° Shore.

10. A tire casing provided with a carcass and adapted to carry a removable tread ring by means of the tire inflation pressure, wherein the improvement comprises a circular rubber sheet disposed in said casing in a radially innermost position with respect to the outer surface of said casing and in a radially outermost position with respect to said carcass.

References Cited
UNITED STATES PATENTS 2,232,001   2/1941   Hawkinson _____ 152—176
2,874,742   2/1959   Lugli _____ 152—176

FOREIGN PATENTS 224,482   11/1962   Austria.

ARTHUR L. LA POINT, Primary Examiner